June 3, 1952　　　F. HUNZIKER　　　2,599,056
SAWING MACHINE
Filed Feb. 14, 1946　　　　　　　　5 Sheets-Sheet 1

INVENTOR.
FRED HUNZIKER
BY Richey & Watts
ATTORNEYS

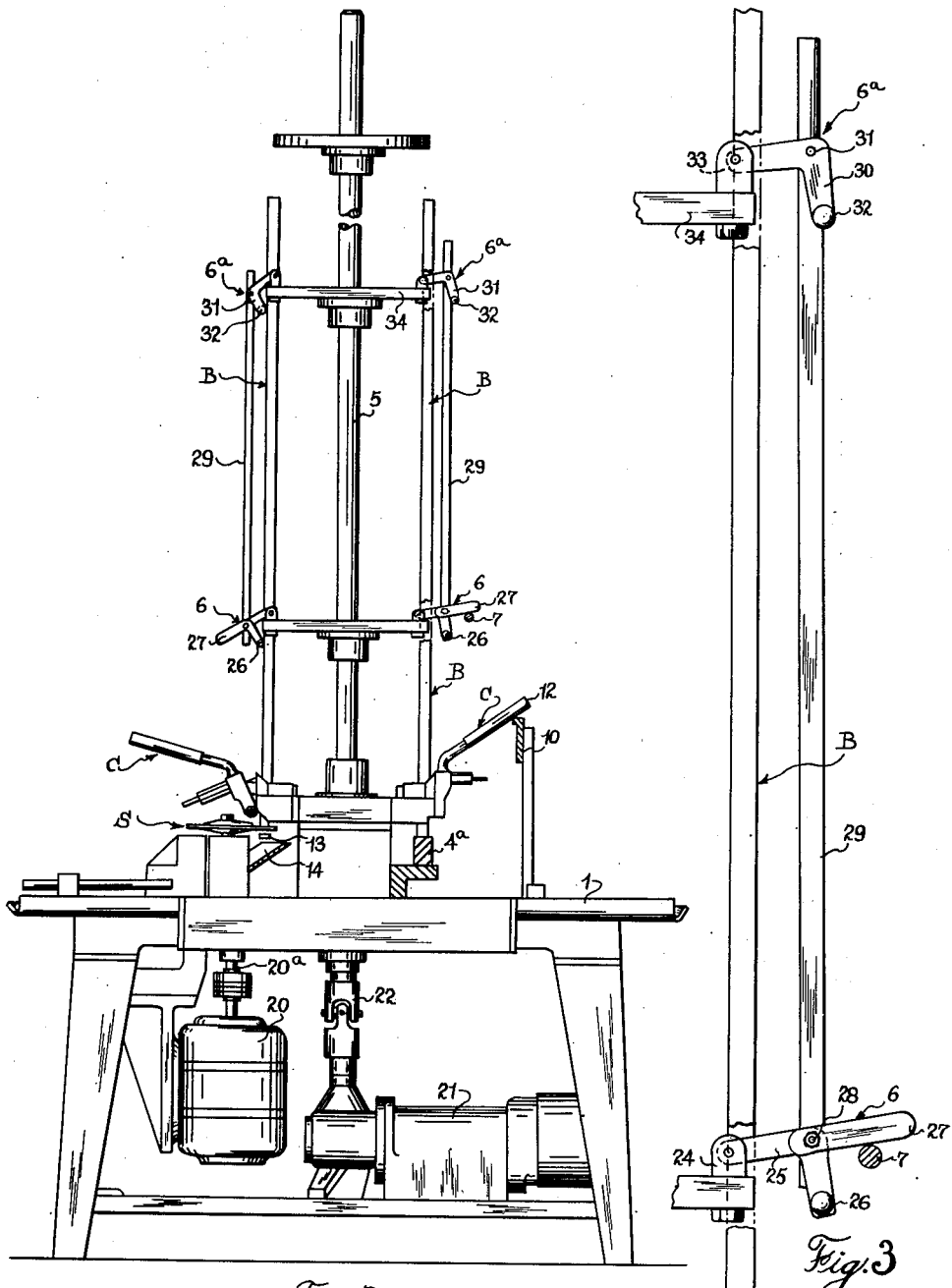

June 3, 1952  F. HUNZIKER  2,599,056
SAWING MACHINE
Filed Feb. 14, 1946  5 Sheets-Sheet 3

INVENTOR.
FRED HUNZIKER
BY Richey + Watts
ATTORNEYS

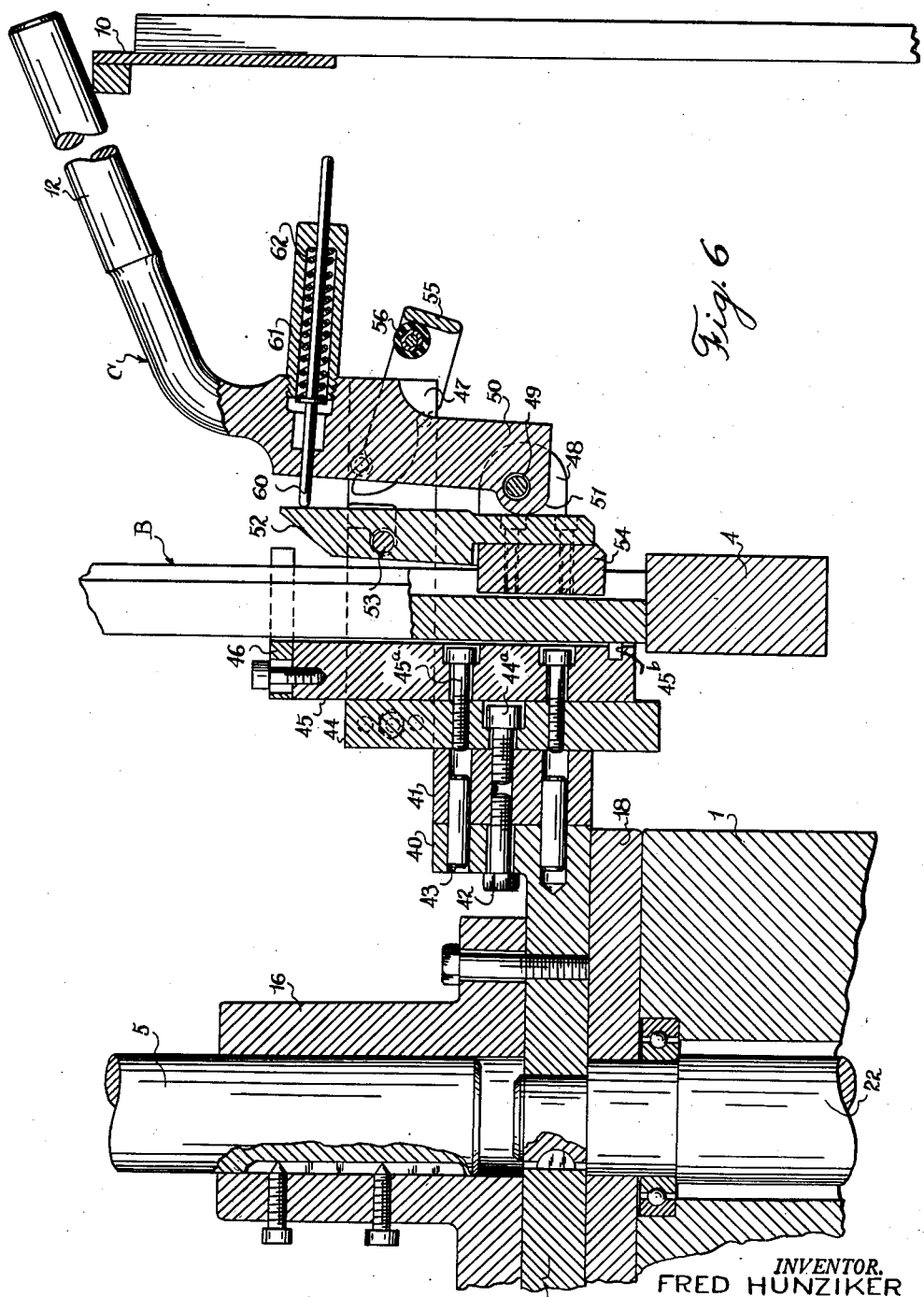

June 3, 1952 F. HUNZIKER 2,599,056
SAWING MACHINE
Filed Feb. 14, 1946 5 Sheets-Sheet 5
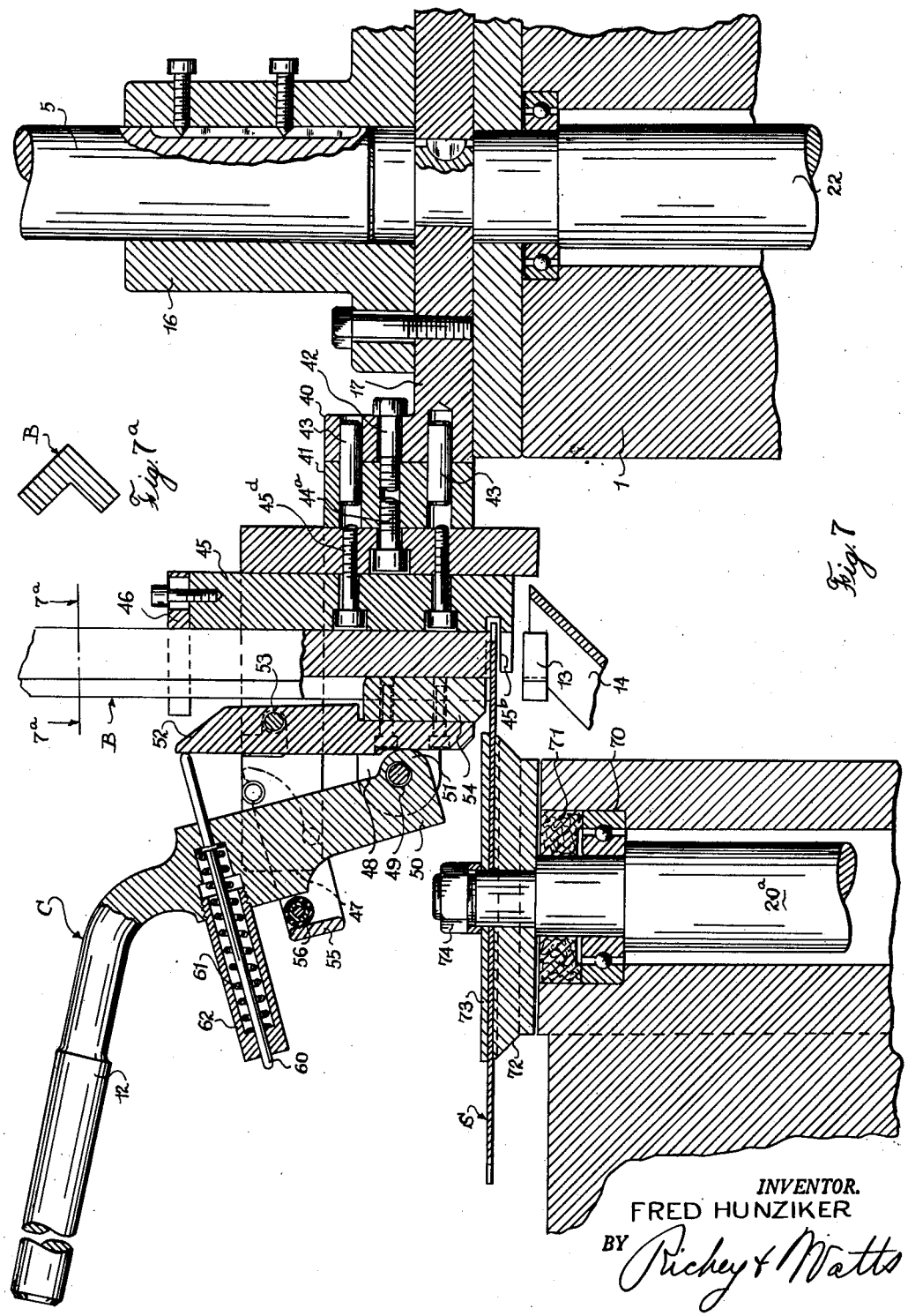
INVENTOR.
FRED HUNZIKER
BY Richey & Watts
ATTORNEYS Patented June 3, 1952

2,599,056

UNITED STATES PATENT OFFICE

2,599,056
SAWING MACHINE

Fred Hunziker, Cleveland, Ohio, assignor to The Weatherhead Company, Cleveland, Ohio, a corporation of Ohio Application August 14, 1946, Serial No. 690,474

7 Claims. (Cl. 29—69)

This invention relates to a sawing machine, more particularly to an apparatus and method for sawing off blanks from bar or tube stock automatically which blanks are held to close tolerances.

It is an object of this invention to provide an apparatus which will rapidly saw off blanks from bar stock, which blanks are accurately sawed to length and which requires no complicated feeding mechanism for the bar stock.

It is another object of this invention to provide a precise gravity feed arrangement coupled with an automatic clamping arrangement for the bar stock.

It is another object of this invention to provide a multiple machine wherein a plurality of bars are loaded in the machine and the blanks sawed therefrom in rapid succession as the spindle carrying the bars is rotated.

It is a further object of this invention to provide a positive and yet simple clamping mechanism for holding the bar against the force of gravity during the sawing operation.

Still another object of this invention resides in the provision of an auxiliary bar-clamping means which cants the bar slightly in the main clamp thereby greatly increasing the clamping action of the main clamp.

A further object of one form of this invention lies in the provision of means to shake the bars so that they fall under acceleration of gravity against the positioning cam and are thereby accurately positioned after they are clamped. This is particularly useful where lightweight stock such as tubing is employed.

Still another object resides in providing the clamp which will receive asymmetrical bars of certain shapes regardless of which end of the bar is fed first into the clamp when the machine is being loaded. Also, the clamp supports the stock both above and below the saw to prevent buckling.

These and other objects will appear in the following detailed description of my invention.

In the drawings:

Fig. 2 is a diagrammatic view of the machine showing only two bars and associated mechanism, the purpose of the figure being to show how the relationship of the saw and the means to release the clamp, permit gravity to position the bar;

Fig. 3 is an enlarged view of the mechanism which cants the bars and augments the clamping action of the main clamp;

Fig. 6 is a partial section through the machine showing the clamp released and gravity pulling the bar against the feed stop;

Fig. 7 is the corresponding section at the other side of the machine showing how the saw cuts off the blank;

Figure 1:
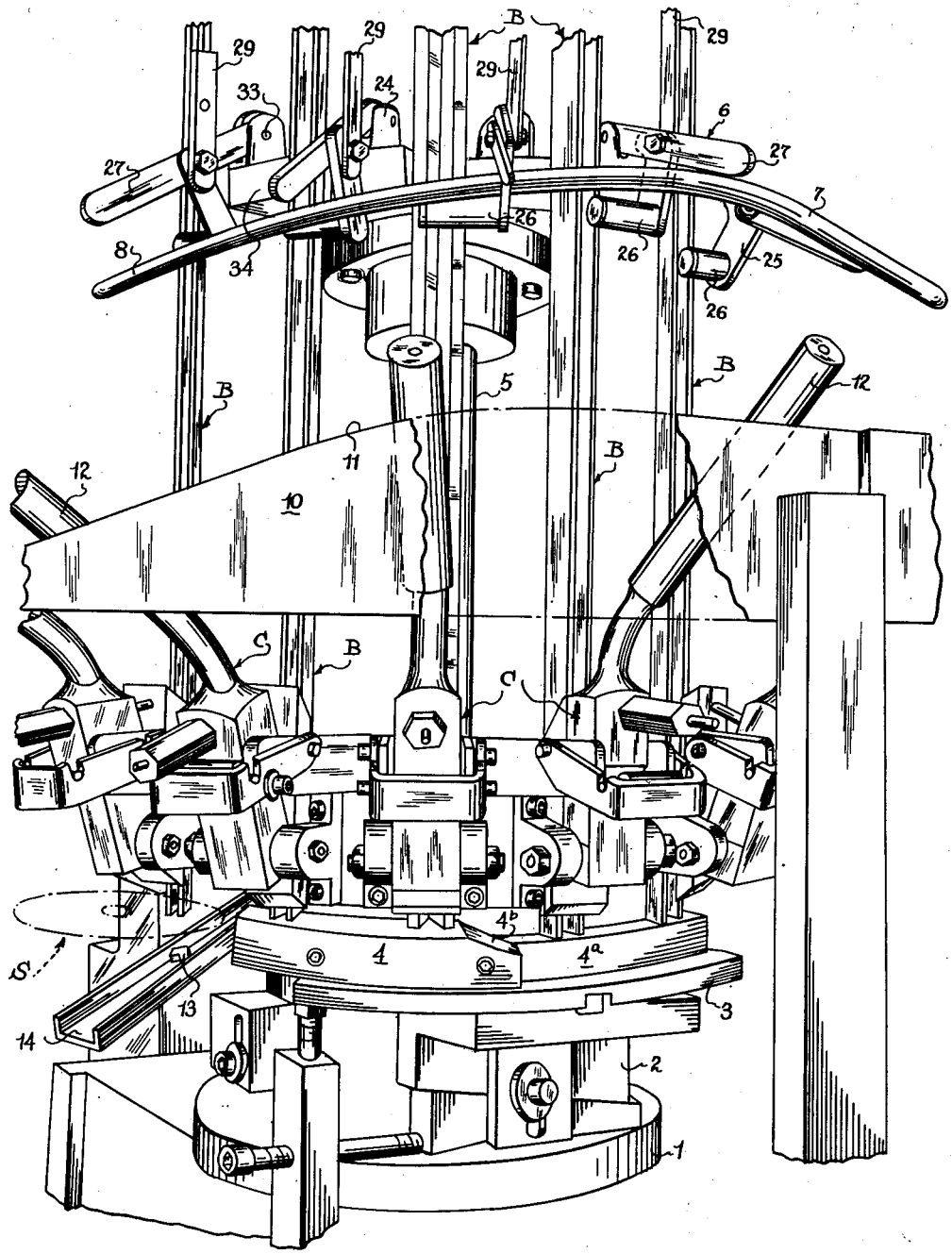
Fig. 1 is a perspective view of the machine loaded with bars showing certain of the basic parts of the assembly, the bars around behind the machine being omitted for clarity.
Figure 4:
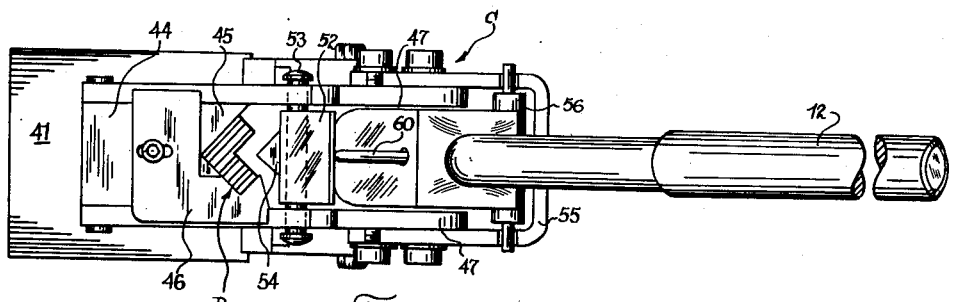
Figs. 4 and 5 are external views of the main clamp, Fig. 4 being a plan view and Fig. 5 a side elevation.
Figure 5:
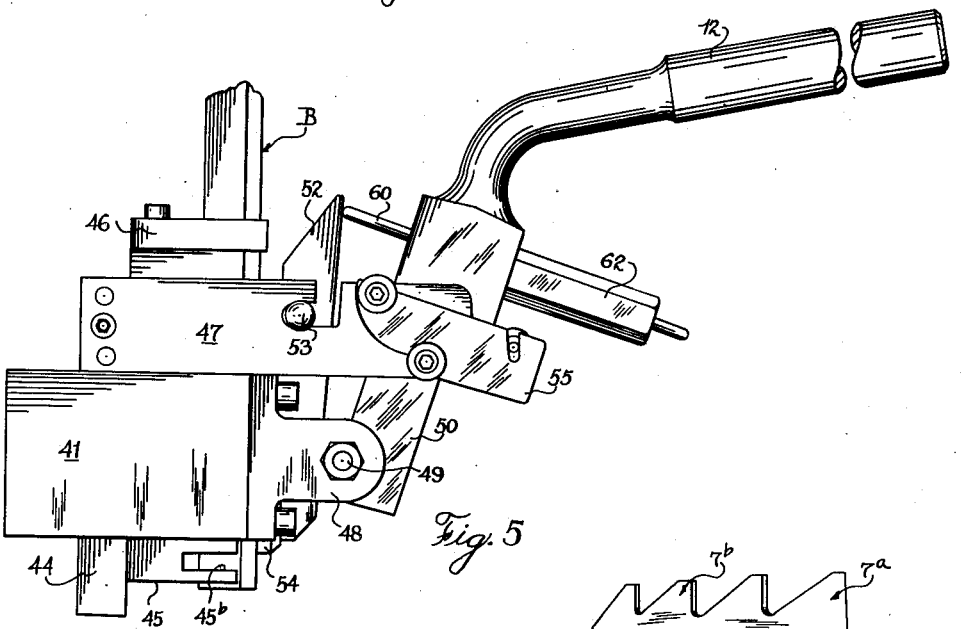

In Fig. 1, 1 represents generally the base of the machine, the table and supporting legs being omitted in this view. The structure shown generally at 2 mounts the bar positioning stop, adjustable means being provided to raise and lower the stop in accordance with the length of the blank to be produced. The platform 3 supported by the adjusting means mounts the stop piece 4 against which the bars B rest when the clamp C is released. In the preferred form the bars are permitted to drop against the stop portion 4 and then as the clamp assembly continues to rotate about the axis of the upright 5, the clamp is released and the bars slide down the incline 4b and are gradually brought to rest on stop portion 4a. This construction drops the bars down gradually to their final position without rebound or bounce. When they are in this position the clamp C clamps the bars firmly in their lower position so that the blank can be cut off by the saw S. The arms 12 of the clamp C are weighted in a direction to close the clamp and in operation the arms ride up the surface 11 of the clamp release cam 10, as the machine spindle rotates which, as will be seen presently, releases the clamp and permits the gravity to pull the bars B against the stops 4 and 4a as just described.

Fig. 2 shows two bars and their associated mechanism diagrammatically. It can be seen that in addition to a lower canting assembly indicated generally at 6 there is an upper assembly 6a, the two being linked together by a link 29. When lever 27 is free of cam 7, the rollers 26 and 32 rest against the bar as seen at the left of Fig. 2 tending to cant the bar in clamp C and augment the clamping action.

Fig. 3 is an enlarged view of the bar canting mechanism at a position where it releases the bar. A lower support 24 pivotally mounts a bell crank 25 which carries the roller 26 for bearing upon the bar. An arm 27 is fastened to the bell crank for engagement with the release cam 7. The assembly is pivoted to another bell crank 30 at 31 to operate the upper assembly 6a. An upper roller 32 is provided to engage the bar and the bell crank 30 is pivoted to a platform 34 supported on the spindle at 33. When the bars are first loaded in the machine they are relatively long and heavy and a small amount of force applied by the canting mechanism tends to cant the bars in the main clamp C and greatly augments the clamping action. This insures that once the bars are properly positioned against the stop rest 4 that they will be held in that position while the blank is being sawed off. Two canting assemblies are provided to handle both long and short bars.

Fig. 2 also shows one possible driving arrangement wherein a separate motor 20 may be provided to drive saw S through shaft and coupling assembly 20a, and the spindle that supports the bars may be driven by another motor through gear reduction 21 and universal joint assembly 22.

Two external views of the main clamp C appear in Figs. 4 and 5 and Figs. 6 and 7 show cross sections through the clamp. The clamps C that support the work may be attached to a flange member 17 as seen in Fig. 6 which is driven by the shaft 22. The upper portion of the machine may be supported by a collar 16 which carries the vertical spindle 5. A thrust washer 18 may also be provided. A vertical flange 40 on the member 17 may be provided to mount a block 41 which forms part of the clamp. The parts may be fastened together by bolt 42 and locating pins 43. A plate 44 may be attached to the block 41 by means of a bolt 44a. Member 45 acts as a guide for the stock and may be shaped to fit the section of the stock being sawed. This member is bolted by means of bolts 45a to member 44. A slot 45b is provided to receive the same. With this construction the stock is supported above and below the saw which prevents buckling where light stock or tubing is employed.

Member 46 may be attached to plate 45 to act as an adjustable guide for the stock at hand. A pair of straps 46 are fastened to plate 44, which straps act as guides for the clamp block 50 and also support the back stop 55 in which rubber-covered roller 56 may be mounted. Members 48 are integral with or attached to a block 41 and pivot bolt 49 passes therethrough and also through the clamp block 50. Block 50 has a cam portion 51 which is contoured so that as the handle 12 moves down, the clamp plate 52 is urged towards the bar B. A clamping piece 54 may be formed separately from the clamp plate 52 and shaped to grip the stock being sawed. Clamping plate 52 is pivoted to the straps 47 by means of pin 53. In the examples shown the stock has a right angle cross section and the clamping piece 54 is formed accordingly. If tubing were being cut the piece 54 would be recessed to receive the tubing. In order to insure that clamping block 54 is withdrawn from the bar when the handle 12 is raised by cam 10 as shown in Fig. 6, a spring pressed plunger 60 may be mounted in the clamping block 50 by means of a housing 62 which contains an operating spring 61. Fig. 6 shows the clamp when it is in its released position with the bar B being urged against the stop 10 under the force of gravity.

Fig. 7 shows the clamp clamping the bar and holding it as the saw cuts off the blank 13. The bar illustrated has an angular section as shown in Fig. 7a. Fig. 7 also shows how the saw S may be mounted on the shaft 20a which runs in bearing 70 and which may have sealing washer 71 to keep out chips. The saw may be clamped between plates 72 and 73 by means of nut 74.

The principles of operation of the machine are clearly shown by the figures heretofore described and with my novel machine, blanks such as 13 may be rapidly sawed off to close tolerances as the machine spindle 5 is rotated. The vertical arrangement of the bars eliminates necessity for any positive feeding mechanism, insures that chips will fall clear of the machine, and makes it simple to provide a chute for the blanks to fall into and be carried away. It also enables the stock to be positioned against a simple stop plate 4 which cannot get out of adjustment and which eliminates erratic operation that might result from use of a mechanical feeding device.

Figure 8:
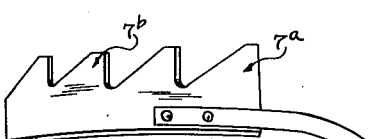
Fig. 8 shows one form of mechanism to actuate the bar canting levers which mechanism also tends to shake the bar and insure that gravity will pull it against the feed stop.

In some cases it may be desirable to assist the force of gravity in its action of pulling the bar down against the stop 4, particularly where lightweight stock or tubing is used. To this end a toothed member 7a shown in Fig. 8, which has a series of teeth 7b, may replace the cam 7 shown in Fig. 1. The tooth member 7a may be adjusted so that the fingers of the bar canting assembly ride over the upper portion of the teeth as the machine spindle is rotated which provides a shaking or jiggling action against the bars and insures that they will fall upon and rest solidly upon the stop piece 4.

Figure 9:
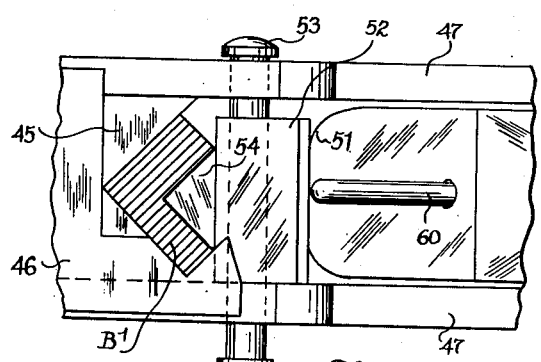
Fig. 9 is a partial plan view of the main clamp showing how it will accommodate itself to an asymmetrical bar.

It may happen that in case of angular bars that one leg is thicker than the other leg. This is the case in Fig. 9 where the bar $B_1$ is not symmetrical. To insure that the machine will operate regardless of which way the bar is inserted in the clamp, clamping bar 52, which carries a clamping block 54, is mounted loosely between the straps 47 so that it can slide somewhat on the pivot pin 53. With this construction the clamp can move to automatically accommodate itself to the bar $B_1$ regardless of which end of the bar is down.

From the foregoing description, it can be seen that I have provided a simple machine which will rapidly and accurately cut blanks from a bar stock so that no difficulty is encountered in further machining operation. I contemplate that various modifications may be made—of course, the shape of the clamp block 54 and the guide plate 45 are selected to accommodate the type of stock being sawed. The various design details such as the mounting of the spindle 5 and the mounting of the saw may be varied in accordance with usual machine design practice. I have shown in detail one successful method of constructing a clamp but contemplate that the part shown separately may be made integral and vice versa. Essentially what is required is a clamp which will support the bar when the arm 12 is urged downward under the force of gravity and which will release the bar and let it drop against the stops when the arm is raised by the release cam 10. These and other modifications may be made without departing from the spirit of the invention as defined in the appended claims.

Having thus described the present invention so that others skilled in the art may be able to understand and practice the same, I state that what I desire to secure by Letters Patent is defined in what is claimed.

What I claim is:

1. In a metal cutting machine, a bed, vertical stock guide means, clamping means supported on said bed including shoe means for engaging the stock, a weighted arm for urging said shoe means against the stock under force of gravity to clamp the stock against the guide means, a stop piece supported by the bed for engagement by the lower end of the stock with the clamp released, metal cutting means vertically above and circumferentially spaced from said stop piece, and cam means to lift said weighted arm and release said clamp when the bar is over the stop piece, said clamping means and the balance of the apparatus being relatively movable whereby the clamp is released, stock is dropped on the stop piece, and a blank is cut off.

2. In a metal cutting machine, a bed, vertical stock guide means, clamping means supported on said bed including shoe means for engaging the stock, a weighted arm for urging said shoe means against the stock under force of gravity to clamp the stock against the guide means, a stop piece supported by the bed for engagement by the lower end of the stock with the clamp released, metal cutting means vertically above and circumferentially spaced from said stop piece, movable stock engaging and canting means above said clamping means for urging the stock against one wall of said guide means under the force of gravity, and cam means to lift said weighted arm and release said canting means when the bar is over the stop piece, said clamping means and the balance of the apparatus being relatively movable whereby the clamp is released, stock is dropped on the stop piece, and a blank is cut off.

3. In a metal cutting machine, a bed, clamping means supported on said bed, said clamping means being arranged to receive and clamp bar stock arranged vertically, a stop piece supported by the bed for engagement by the lower end of the stock with the clamp released, metal cutting means vertically above and circumferentially spaced from said stop piece, means to release said clamp when the bar is over the stop piece, movable means above said stop piece that tend to cant the bar and increase the gripping action of the clamp, means to intermittently release said canting means from the bar when the clamp is released thereby insuring that the bar will fall against the stop piece, said clamping means and the balance of the apparatus being relatively movable whereby the clamp is released, stock is dropped on the stop piece, and a blank is cut off.

4. In a metal cutting machine, a bed, clamping means supported on said bed, said clamping means being arranged to receive and clamp bar stock arranged vertically, a stop piece supported by the bed for engagement by the lower end of the stock with the clamp released, said stop piece having vertically spaced bar engaging surfaces joined by a surface that gradually permits the bar to drop, metal cutting means vertically above and circumferentially spaced from said stop piece, a pair of levers pivotally supported on said bed and having roller means engaging said bar under the force of gravity, a link connecting said levers, one of said levers having an arm for engaging a lifting cam when the bar is over the stop piece, a lifting cam for said levers, and means to release said clamp when the bar is over the stop piece, said clamping means and the balance of the apparatus being relatively movable whereby the clamp is released, stock is dropped on the stop piece, and a blank is cut off.

5. A machine for cutting off lengths of vertically disposed stock comprising a bed, a horizontally movable stock cutter mounted on said bed, a stop means on said bed for receiving the lower end of the stock, and stock support means rotatably mounted on said bed, said stop means being formed with a downwardly sloping upper surface merging with a lower, horizontal circumferential upper surface, the upper portion of said sloping surface being not substantially lower than the horizontal plane of said cutter, the lower surface being below the plane of the cutter by a distance equal to the lengths of stock to be severed; said stock support means including clamp means to hold the stock with its lower end in the plane of said lower strip surface for presentation to the cutter, and means to release said clamp means after the severed stock is disposed over said stop means and before it passes said downwardly sloping surface.

6. A machine for cutting off lengths of vertically disposed stock comprising a bed, a horizontally movable stock cutter mounted on said bed, a stop means on said bed for receiving the lower end of the stock, and stock support means rotatably mounted on said bed, said stop means being formed with an upper horizontal circumferential surface following said cutter, a downwardly sloping upper surface connecting thereto and merging with a lower, horizontal circumferential surface, the upper horizontal surface being not substantially lower than the horizontal plane of said cutter, the lower surface being below the plane of the cutter by a distance equal to the lengths of stock to be severed; said stock support means including clamp means to hold the stock with its lower end in the plane of said lower strip surface for presentation to the cutter, and means to release said clamp means after the severed stock is disposed over the upper horizontal surface of said stop means and before the stock passes said downwardly sloping surface.

7. A machine for cutting off lengths of vertically disposed stock comprising a bed, a horizontally movable stock cutter mounted on said bed, a stop means on said bed for receiving the lower end of the stock, and stock support means rotatably mounted on said bed, said stop means being formed with a downwardly sloping surface merging with a lower, horizontal circumferential surface, the upper portion of said sloping surface being not substantially lower than the horizontal plane of said cutter, the lower surface being below the plane of the cutter by a distance equal to the lengths of stock to be severed; said stock support means including clamp means to hold the stock with its lower end in the plane of said lower strip surface for presentation to the cutter, said clamp means comprising a weighted lever and wedge means operated by the lever to engage the stock, and a cam to lift said lever and release said clamp means after the severed stock is disposed over said stop means and before it passes said downwardly sloping surface.

FRED HUNZIKER.

REFERENCES CITED

The following references are of record in the file of this patent:

UNITED STATES PATENTS

| Number | Name | Date |
|---|---|---|
| 1,440,762 | Berkley | Jan. 2, 1923 |
| 1,546,352 | Rippl | July 14, 1925 |
| 1,769,594 | Nagy | July 1, 1930 |
| 1,914,899 | Syme | June 20, 1933 |
| 2,168,772 | Huffman | Aug. 8, 1939 |
| 2,398,230 | Keller | Apr. 9, 1946 |
| 2,413,016 | Wiken et al. | Dec. 24, 1946 |